(12) United States Patent
Yu

(10) Patent No.: US 6,454,725 B1
(45) Date of Patent: Sep. 24, 2002

(54) THERMOMETER FOR BODY TEMPERATURE DETECTION

(76) Inventor: Chu Yih Yu, 7F, 88 Kuan-Fu Rd., Sec. 1, Sun-chung City, Taipei Hsien (TW)

( * ) Notice: Subject to any disclaimer, the term of this patent is extended or adjusted under 35 U.S.C. 154(b) by 0 days.

(21) Appl. No.: 09/569,413

(22) Filed: May 12, 2000

(51) Int. Cl.$^7$ ................................................. A61B 5/00
(52) U.S. Cl. ...................................................... 600/549
(58) Field of Search ........................................ 600/549

(56) References Cited

U.S. PATENT DOCUMENTS

| | | | | |
|---|---|---|---|---|
| 3,704,705 A | * | 12/1972 | Eckhart ........................ | 600/549 |
| 4,349,031 A | * | 9/1982 | Perlin ........................... | 600/549 |
| 4,443,117 A | * | 4/1984 | Muramoto et al. ............ | 374/1 |
| 5,726,631 A | * | 3/1998 | Lin ............................... | 340/573 |

* cited by examiner

Primary Examiner—Max Hindenburg
(74) Attorney, Agent, or Firm—Leydig, Voit & Mayer, Ltd.

(57) ABSTRACT

Thermometer for body temperature detection comprising a piece of flexible heat-sensitive plastic film, a temperature sensor, an activation device, and a sound emitting device. The sensor is in electrical communication with the activation device, the sound emitting device is in electrical communication with the activation device, and the sensor is attached to the heat-sensitive plastic film in a manner permitting the sensor to detect changes in the plastic film arising from changes in film temperature. The activation device, upon detecting an electrical signal from the sensor that is outside a predetermined range, signals the sound emitting device to emit a sound.

9 Claims, 2 Drawing Sheets

THERMOMETER FOR BODY TEMPERATURE DETECTION

FIELD OF THE INVENTION

The present invention relates to thermometers, and more specifically to thermometers for detecting the body temperature of an animal, particularly a human.

BACKGROUND OF THE INVENTION

A variety of different thermometers suitable for monitoring the body temperature of an animal, e.g., a human patient, are presently available. Examples of such thermometers include traditional glass and mercury thermometers, metallic probe type electronic thermometers, and thermometers that are inserted into the ear canal.

SUMMARY OF THE INVENTION

The present invention provides a thermometer for body temperature detection comprising a piece of flexible heat-sensitive plastic film, a temperature sensor, an activation device, and a sound emitting device, wherein the sensor is in electrical communication with the activation device, the sound emitting device is in electrical communication with the activation device, and the sensor is attached to the heat-sensitive plastic film in a manner permitting the sensor to detect changes in the plastic film arising from changes in film temperature, and wherein the activation device, upon detecting an electrical signal from the sensor that is outside a predetermined range, signals the sound emitting device to emit a sound.

In a preferred embodiment, the flexible heat-sensitive plastic film is located adjacent a piece of material that comes into close contact with the animal, such as clothing or bedding. It is not critical that the film or sensor be in direct contact with the animal, it is sufficient for purposes of the present invention that the heat-sensitive film be positioned to enable the sensor to detect changes in the body temperature through changes in the heat-sensitive film.

These and other features and advantages of the various aspects of the present invention will be more readily apparent upon reading the following description of a preferred exemplified embodiment of the invention and upon reference to the accompanying drawings.

DETAILED DESCRIPTION OF THE PREFERRED EMBODIMENTS

Figure 1A:
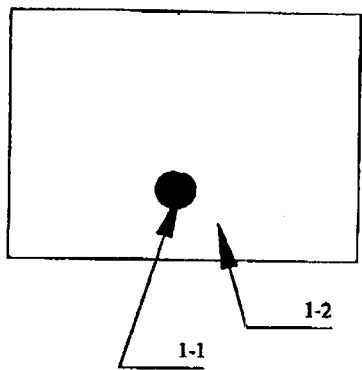
FIG. 1a illustrates one embodiment of the present invention, wherein a circular piece of flexible, heat-sensitive plastic, with a temperature sensor attached thereto, is itself attached to a standard bed pillow.
Figure 1B:
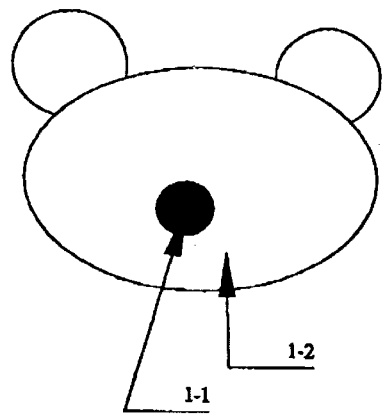
FIG. 1b illustrates another embodiment of the present invention, wherein a circular piece of flexible, heat-sensitive plastic, with a temperature sensor attached thereto, is attached to a lounge-type pillow.
Figure 1C:
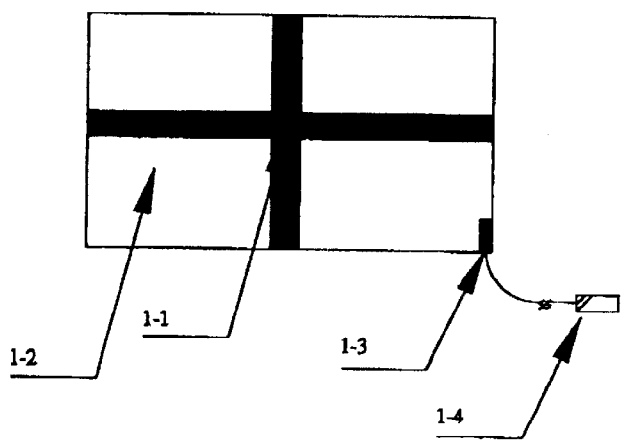
FIG. 1c illustrates another embodiment of the present invention, wherein strips of flexible, heat-sensitive plastic, with a temperature sensor attached thereto, is itself attached to a standard bed pillow.
Figure 1D:
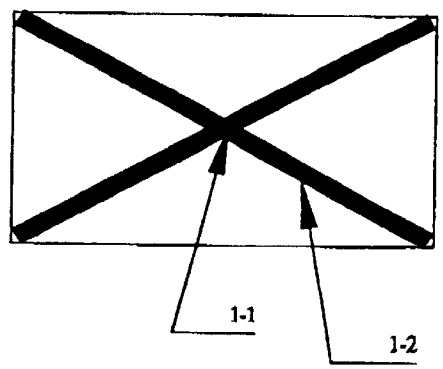
FIG. 1d illustrates yet another embodiment of the present invention, wherein strips of flexible, heat-sensitive, with a temperature sensor attached thereto, is itself attached to a standard bed pillow.
Figure 2A:
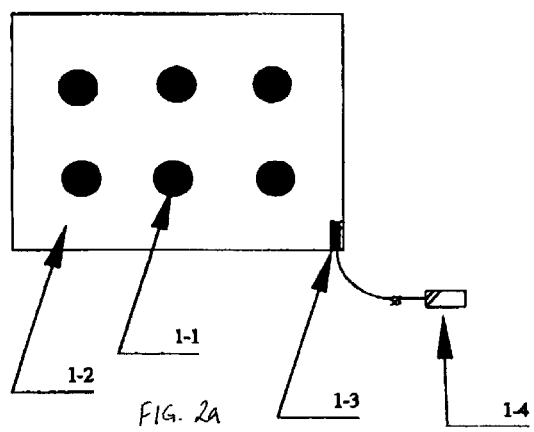
FIG. 2a illustrates a further embodiment of the present invention, wherein a plurality of circular pieces of flexible, heat-sensitive plastic, with a temperature sensor attached to one or more of these plastic pieces, are attached to a standard bed pillow.
Figure 2B:
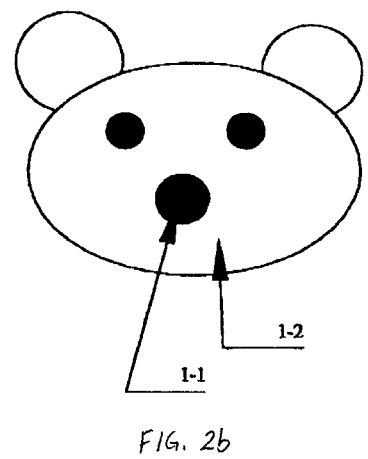
FIG. 2b illustrates another embodiment of the present invention, wherein a plurality of circular pieces of flexible, heat-sensitive plastic, with a temperature sensor attached to one or more of these plastic pieces, are attached to a lounge-type pillow.
Figure 2C:
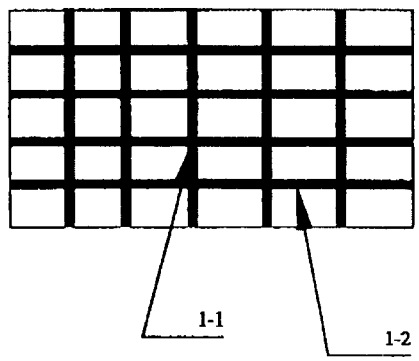
FIG. 2c illustrates yet another embodiment of the present invention, wherein a plurality of strips of flexible, heat-sensitive plastic, with a temperature sensor attached thereto, are attached to a standard bed pillow.
Figure 2D:
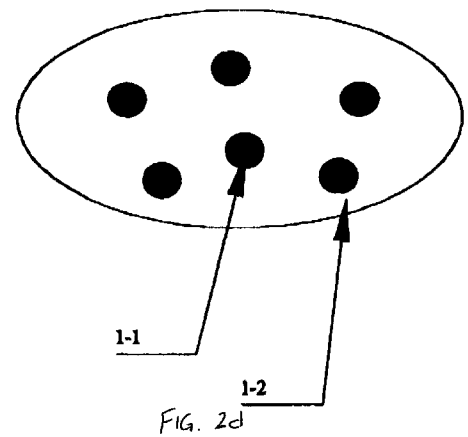
FIG. 2d illustrates a further embodiment of the present invention, wherein a plurality of circular pieces of flexible, heat-sensitive plastic, with a temperature sensor attached to one or more of these plastic pieces, are attached to a small lounge-type pillow.

The present invention provides a thermometer for body temperature detection. In general, the thermometer comprises a piece of flexible heat-sensitive plastic film, a temperature sensor, an activation device, and a sound emitting device. The sensor is in electrical communication with the activation device, and the sound emitting device is in electrical communication with the activation device. The sensor is attached to the heat-sensitive plastic film in a manner permitting the sensor to detect changes in the plastic film arising from changes in film temperature. The activation device, upon detecting an electrical signal from the sensor that is outside a predetermined range, signals the sound emitting device to emit a sound, alerting a caregiver that the patient requires attention.

The heat-sensitive plastic is incorporated in any manner into or laid on top of the pillow, permitting monitoring of the body temperature of a patient who comes into contact with the pillow.

Advantageously, the sensor used on this body temperature thermometer device has the approximate diameter of a pencil lead, to minimize discomfort to the patient. While the sensor may be attached to the plastic film by any suitable means, high-performance heat-conducting adhesive is preferably used.

Plastic films useful in the invention may be any of a number of plastics that are heat-sensitive in the sense that they are able to transmit either a thermal or electrical-type signal to a sensor upon exposure to a change in temperature, in the present case, a change in body temperature. Advantageously, the plastic will be washable and free from defects. Such plastics are well known, and will not be detailed herein. These plastics may be cut into any shape suitable for the desired application. For example, they may be installed within the layers of the pillow cushion for use by the physically impaired elderly, patients, or infants without causing any discomfort. These illustrative embodiments permit the immediate detection of the changes in body temperature, permitting appropriate measures to be taken in a timely manner.

Advantageously, the invention includes a detachable recoil plug. In such an arrangement, lead wires are typically run from the sensor to the plug. The inclusion of the plug permits the easy removal of components, such as the sensor activation device and sound emitting device, from the components installed within the layers of the pillow cushions. This eases cleaning of the pillow cushion.

One of the advantages of the present invention is that it allows the detection of body temperature associated with abnormal conditions as the temperature begins to deviate from its normal condition. This is distinguishable from conventional body thermometers that can only detect the fever after it has occurred. Therefore, when the patient or the infant begins to experience a rise in body temperature, the present invention provides an immediate indication, permitting the necessary measures to be taken right away, and avoiding the potential dangers caused by delayed treatment.

This invention provides the further advantage of eliminating the need to tap tedious wirings or stick pads on the body of patient to permit body temperature detection. Instead, body temperature is detected only via the contact of the body and the pillow, in a preferred embodiment of the invention. Advantageously, a user is able to preset the range of temperature detection between 32° C. and 43° C. with temperature deviation detection sensitivity of 0.1° C., with a response time within one second, and prompt sound alarm.

Turning now to the drawings, FIGS. 1a–2d illustrate a variety of illustrative embodiments of the present invention. For example, the plastic film may be cut to a desired shape, and arranged in one or more pieces adjacent to or within a pillow, bedding, or article of clothing. In each figure, the heat-sensitive film and sensor combination 1—1 is shown attached to a pillow 1-2 in various configurations, as shown in FIGS. 1a–2d respectively. If desired, the sensor may be connected via a paired lead wire to a detachable recoil plug 1-3, and the other end of the detachable recoil plug 1-3 may be connected to a sensor activation device and sound emitting device 1-4, as shown in FIGS. 1a and 2a. Of course, the activating device and sound emitting device may be included in separate enclosures without departing from the scope of the present invention.

In the embodiments illustrated in the figures, a patient rests his head on the pillow cushion, and the head temperature is then sensed and transmitted to the heat-sensitive sensor via the heat-sensitive plastic film, and the value of the electrical resistance of the said heat-sensitive plastic film, which is in proportion to the temperature at the sensor, is transmitted to the sensor activation device via a paired lead wire. If the temperature exceeds the pre-set temperature range of the sensor activation device, the sensor activation device will activate the sound emitting device, which will sound an alarm, preferably within one second. The sensor activation device, and sound emitting device, are well known in the art and may be of any suitable construction. As such, they will not be discussed in detail herein.

From the above descriptions, it is understood that this invention as a body temperature thermometer enables prompt detection of changes in body temperature, and in turn allows the immediate treatment of the physically-impaired elderly, patients, or infants. The effectiveness and practicality of this product is very obvious.

Various additional modifications of the embodiments specifically illustrated and described herein will be apparent to those skilled in the art, particularly in light of the teachings of this invention. The invention should not be construed as limited to the specific form and examples as shown and described, but instead is set forth in the following claims.

What is claimed is:

1. A thermometer for body temperature detection comprising a piece of flexible heat-sensitive plastic film, a temperature sensor, an activation device, and a sound emitting device, wherein the sensor is in electrical communication with the activation device, the sound emitting device is in electrical communication with the activation device, and the sensor is attached to the heat-sensitive plastic film in a manner permitting the sensor to detect changes in the plastic film arising from changes in film temperature, and wherein the activation device, upon detecting an electrical signal from the sensor that is outside a predetermined range, signals the sound emitting device to emit a sound.

2. The device of claim 1, further comprising a detachable recoil plug.

3. The device of claim 1, wherein the flexible heat-sensitive film is provided in a plurality of pieces.

4. A method of monitoring the temperature of a patient comprising:

a) providing a thermometer device comprising a flexible heat-sensitive plastic film, a sensor attached to the heat-sensitive plastic film which detects changes in the plastic film as a function of film temperature, wherein the sensor emits an electrical signal when the temperature of the patient deviates from a preselected range, an activation device in electrical communication with the sensor, and a sound emitting device in electrical communication with the activation device;

b) placing the flexible heat-sensitive plastic film of the device adjacent to the patient; and c) monitoring the sound emitting device.

5. The method of claim 4, wherein the plastic film is located in the patient's bedding.

6. The method of claim 5, wherein the plastic film is located underneath the patient's head.

7. The method of claim 6, wherein the plastic film is located in a pillow.

8. The method of claim 4 wherein the thermometer device further comprises a detachable recoil plug.

9. The method of claim 4, wherein the flexible heat-sensitive film is provided in a plurality of pieces.

* * * * *